United States Patent [19]

Sekino et al.

[11] 4,451,369

[45] May 29, 1984

[54] FLUID SEPARATION APPARATUS

[75] Inventors: Masaaki Sekino, Otsu; Yoshiyuki Fujita, Kyoto; Tetsuo Ukai, Otsu, all of Japan

[73] Assignee: Toyo Boseki Kabushiki Kaisha, Japan

[21] Appl. No.: 331,713

[22] Filed: Dec. 17, 1981

[30] Foreign Application Priority Data

Dec. 18, 1980 [JP] Japan .................................. 55-180171

[51] Int. Cl.³ ............................................ B01D 31/00
[52] U.S. Cl. ............................... 210/321.1; 210/323.2; 210/336; 210/433.2
[58] Field of Search .................. 210/433.2, 336, 323.2, 210/321.3, 321.1, 321.2, 321.4, 321.5; 55/158

[56] References Cited

U.S. PATENT DOCUMENTS

| 4,080,296 | 3/1978 | Clark | 210/323.2 |
| 4,259,097 | 3/1981 | Patel et al. | 210/323.2 X |
| 4,293,419 | 10/1981 | Sekino et al. | |
| 4,306,973 | 12/1981 | Ishikawa | 210/336 |
| 4,352,736 | 10/1982 | Ukai et al. | 55/158 X |

OTHER PUBLICATIONS

"Reverse Osmosis and Synthetic Membrane", NRCC Publication (1977).

Primary Examiner—Frank A. Spear, Jr.
Attorney, Agent, or Firm—Jones, Tullar & Cooper

[57] ABSTRACT

A hollow fiber membrane-type fluid separation apparatus useful for selective separation of fluids in various techniques such as gas permeation, liquid permeation, dialysis, ultrafiltration, reverse osmosis, etc., which comprises at least one pair of unit structures which are arranged uniaxially in series within a cylindrical pressure vessel, said pair of unit structures comprising a pair of cylindrical hollow fiber assemblies having a selective permeability, a means for collecting permeated fluid, which is held between side tube sheets provided each at a terminal of the pair of cylindrical hollow fiber assemblies and is capable of collecting the fluid which passes through the side tube sheet, a permeation fluid pipe for taking out the permeated fluid, which penetrates perpendicularly the means for collecting a permeated fluid at the center, and a fitting means provided with a passageway for passing a concentrated fluid being not permeated, said passageway being arranged at around central region of the means for collecting a permeated fluid so as to surround the permeation fluid pipe.

9 Claims, 4 Drawing Figures

FLUID SEPARATION APPARATUS

The present invention relates to a fluid separation apparatus, more particularly to a fluid separation apparatus using a hollow fiber membrane, a membrane wall of which has a selective permeability to fluids.

The fluid separation apparatus for separating components of fluids by using a membrane having a selective permeability is applied to various techniques such as gas permeation, liquid permeation, dialysis, ultrafiltration, reverse osmosis, or the like. Recently, attention has been particularly given to the reverse osmosis which is effective for desalination of sea water or brackish water, for recovering useful or harmful components from waste water, or for reuse of water. The reverse osmosis is usually carried out by treating a fluid under a pressure higher than the osmotic pressure of the fluid, by which the components of fluid are separated via a membrane having a selective permeability. The pressure may vary with the kinds of fluids to be treated, the properties of the selectively permeable membranes, or the like, but is usually in the range of from several $kg/cm^2$ to more than 100 $kg/cm^2$. Accordingly, it is very important that the membrane, the supporting material and the casing vessel, etc. used for the reverse osmosis should have a high pressure resistance.

A reverse osmotic membrane of hollow fibers has a greater pressure resistance in comparison with other types of membranes such as flat membrane-type, tubular-type, or spiral-type, and hence, it requires no membrane support. Further, the hollow fiber membrane-type separation apparatus has an extremely large fluid-treating volume per apparatus owing to the particularly greater amount of membrane surface area per unit volume of apparatus. Moreover, since the hollow fiber membrane-type separation apparatus has a smaller fluid permeation amount per unit membrane area in comparison with the other types of apparatuses, the concentration polarization phenomenon at the area around the membrane surface at the feed side becomes very small and can be ignored. Accordingly, in the hollow fiber membrane-type apparatus, the concentration magnification (known in reverse osmosis as "recovery ratio") can be made several times as much as that in other types of apparatuses. Thus, the apparatus has an extremely high efficiency.

The hollow fiber membrane-type separation apparatus can be enlarged by utilizing its high volume efficiency and high concentration magnification as mentioned above. In this case, the following points must be taken into consideration.

(1) By pressure loss due to permeation flow within the hollow fibers, the hollow fibers within the hollow fiber assemblies are restricted in the longitudinal direction.

(2) It is economical to enlarge the ratio of length/radius of the cylindrical pressure vessel which contains hollow fiber assemblies in view of scale-up. In other words, it is preferable to enlarge the apparatus in the longitudinal direction.

Accordingly, the hollow fiber membrane-type reverse osmosis apparatus has preferably a cylindrical pressure vessel having a long length wherein a plurality of hollow fiber assemblies are provided, by which a large volume of liquids can be economically and advantageously treated. Particularly, when a plurality of hollow fiber assemblies are arranged in series (that is, the concentrated liquid being not permeated in the first hollow fiber assembly is fed to the second hollow fiber assembly and further turned to the third assembly, the fourth assembly, . . . in sequence), the concentrated liquid (i.e. the liquid to be fed to the next hollow fiber assembly) can flow at a higher speed, and thereby the small concentration poralization phenomenon can be made greatly smaller and a permeated liquid having a higher quality can be obtained.

Based upon the above idea, it has been proposed to contain a plurality of hollow fiber assemblies in a single pressure vessel. In such hollow fiber assemblies, a tube sheet is provided at a terminal of a hollow fiber bundle perpendicularly to a core of the hollow fiber bundle, the lumens of said hollow fibers being opened into the tube sheet, and hence, when a plurality of hollow fiber assemblies are contained in a single pressure vessel, the tube sheet rather inhibits flowing out of the treated liquid. For this reason, in the known hollow fiber membrane-type fluid separation apparatus, at most two hollow fiber assemblies are contained in a vessel, wherein the tube sheets are provided at both terminals of the assemblies faced to the end wall of the pressure vessel, and the liquid to be treated is flowed into the apparatus through the outer surface of the cylindrical pressure vessel at the central region thereof. Alternatively, two tube sheets are provided so as to be faced to each other via a means for collecting liquids, and the permeated liquid is taken out from an outlet provided at the outer surface of the cylindrical pressure vessel at the central region thereof. According to these known apparatuses, when more than two, particularly more than four, of the hollow fiber assemblies are contained in the vessel, the connection and arrangement of inlet and outlet of the fluids becomes complicated, and further, extra space for maintenance of piping and jointing surrounding the cylindrical vessel is inadvantageously required in addition to the space for the terminal parts of the pressure vessel.

As a result of the present inventors' extensive study, an improved hollow fiber membrane-type fluid separation apparatus without drawbacks as in the conventional apparatuses as mentioned above has been found.

An object of the present invention is to provide an improved hollow fiber membrane-type fluid separation apparatus wherein at least one pair of hollow fiber assemblies are contained. This and other objects and advantages of the present invention will be apparent from the following description.

The hollow fiber membrane-type fluid separation apparatus of the present invention comprises at least one pair of unit structures which are arranged uniaxially in series within a cylindrical pressure vessel, said pair of unit structures comprising a pair of cylindrical hollow fiber assemblies having a selective permeability, a means for collecting a permeated fluid, which is held between side tube sheets provided each at a terminal of the pair of cylindrical hollow fiber assemblies and is capable of collecting the fluid which passes through the side tube sheets, a permeation fluid pipe for taking out the permeated fluid, which penetrates perpendicularly the means for collecting a permeated fluid at the center, and a fitting means provided with a passageway for passing a concentrated fluid which has not been permeated, said passageway being around the central region of the means for collecting a permeated fluid so as to surround the permeation fluid pipe.

The means for collecting a permeated fluid and the fitting means are preferably made integrally (i.e. in a solid structure).

The fluid separation apparatus of the present invention will be illustrated in more detail with reference to the accompanying drawing.

Figure 1:
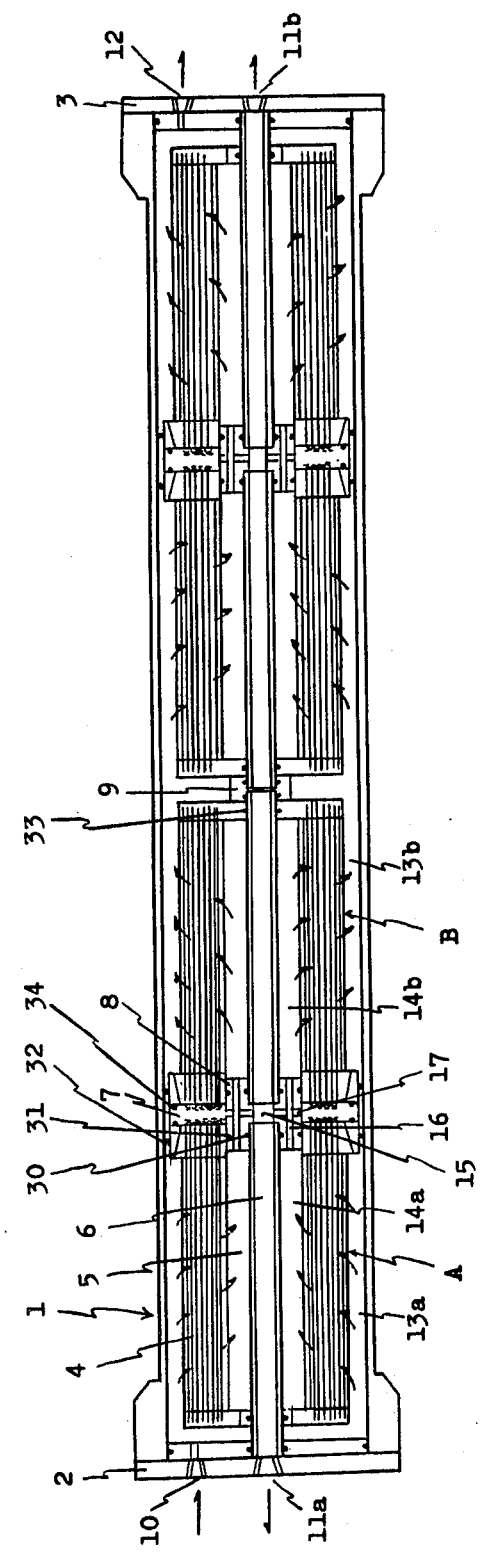
FIG. 1 shows a schematic sectional view of an embodiment of the present fluid separation apparatus wherein four hollow fiber assemblies are contained.
Figure 2:
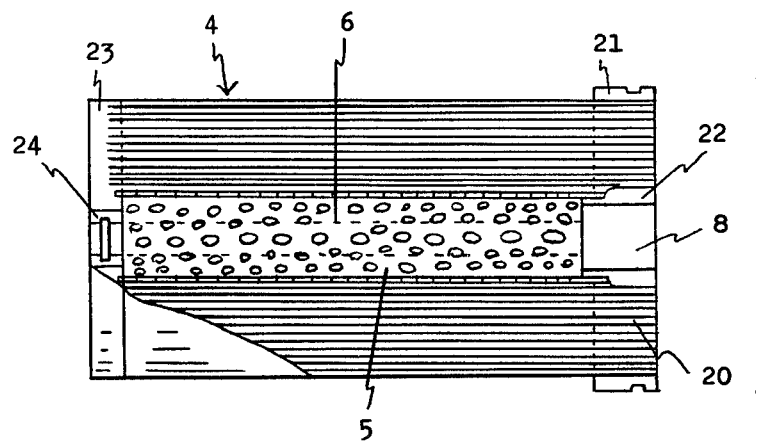
FIG. 2 shows a schematic sectional view of an embodiment of a hollow fiber assembly to be contained in the present fluid separation apparatus.

Referring to FIG. 1, the hollow fiber assemblies (4) are contained in a cylindrical pressure vessel (1) in a pair of two assemblies, wherein a means (7) for collecting a permeated fluid and a fitting means (8) are held between side tube sheets (20) which are each provided at a terminal of the hollow fiber assemblies. As is shown in FIG. 2, the hollow fiber assemblies are formed by wrapping a core (5) for a hollow fiber bundle with a bundle of hollow fibers and adhering and solidifying both ends of the bundle with a resin. At one terminal thereof, two rings (21) and (22) are fitted onto the outer periphery and the inner periphery of the hollow fiber bundle, respectively, and thereafter, the end of the hollow fiber bundle is adhered and solidified with a resin and the surface of the adhered bundle is cut perpendicularly to open the ends of the hollow fibers. When the hollow fiber assemblies are set in a cylindrical pressure vessel, the outer ring (21) is engaged with the innerface of the cylindrical vessel and sealed therebetween, and the inner ring (22) is engaged with the peripheral surface of the fitting means (8) and sealed therebetween. At the other terminal of the hollow fiber assemblies, the end of the hollow fiber bundle is adhered and solidified with a resin together with an end-block ring (24) having a diameter smaller than the diameter of the core (5), by which a fluid passed through the hollow fiber bundle is separated from fluid present in another space. The end-block ring (24) is engaged with the peripheral surface of a permeation fluid pipe (6) and is sealed therebetween.

The core for the hollow fiber bundle may be a columnar core having bores for flowing a fluid in the axial direction and perpendicular direction or a packing material having fluid-flowing bores, for example, a core tube having plenty of pores on the side wall, a dispersion tube comprising plenty of wires in the cylindrical form, or a column having continuous projections in the longitudinal direction. A single core is used between the resined terminals of the hollow fiber assembly.

The hollow fibers are wrapped on the peripheral surface of the core to form a layer of hollow fibers. The wrapping of hollow fibers can be done in various manners, for example, by winding the hollow fibers on the core approximately parallel to the longitudinal axis of the core or in a spiral by traversing the fibers between one end and the other end of the core.

The hollow fibers wound on the core are preferably arranged so as to mutually cross at an angle of 5°–60° inclined to the longitudinal axis of the core. When the winding angle is smaller than the above lower limit, the hollow fiber bundle is easily collapsed during use, and on the other hand, when the winding angle is larger than the above upper limit, excessively long fibers are required, which results in a large pressure loss due to the flow of the permeation fluid and then the fluid permeation amount decreases. Besides, the hollow fiber bundle has preferably a fiber packing density of 45 to 70%, more preferably 50 to 65%. When the fiber packing density is smaller than 45%, the fluid flows too easily, and hence, undesirable short-pass of the fluid occurs at an upper flow in the hollow fiber bundle and the fluid does not uniformly disperse in the axial direction, which results in lowering of separation efficiency and easy collapse of the hollow fiber bundle. On the other hand, when the fiber packing density is over 70%, the fluid hardly flows in the hollow fiber bundle and higher pressure is required in order to flow the fluid, which results in a larger pressure loss.

Referring to the fluid separation apparatus as shown in FIG. 1, the flow of fluid in case of reverse osmosis is illustrated below. According to the apparatus of FIG. 1, the fluid to be treated can be fed to either an inlet and outlet end (10) or an inlet and outlet end (12). When the fluid to be treated is fed to the inlet and outlet end (10), the fluid is flowed into an annular space (13a) which is formed between a peripheral surface of a first hollow fiber bundle (A) and the inner surface of the cylindrical vessel, and thereafter, the fluid passes across the hollow fiber bundle perpendicularly and flows into an annular space (14a) which is formed between the peripheral wall of the hollow fiber bundle core (5) and the peripheral surface of the permeation fluid pipe (6) which is coaxially provided at the central region of the core (5). During passage through the hollow fiber bundle wherein the fluid to be treated is under a pressure of several $kg/cm^2$ to 100 $kg/cm^2$ or more, the fluid is selectively separated with the hollow fiber membrane having a selective permeability by reverse osmosis, and the permeated fluid is flowed into the lumens of the hollow fibers via the hollow fiber membrane. A concentrated fluid (i.e. the remaining fluid which does not permeate the hollow fiber membrane) passes through a concentrated fluid passageway (16) which is provided within the fitting means (8) sealingly engaged with the tube sheet of the hollow fiber assembly at the central region thereof, and then flows into an annular space (14b) of a second hollow fiber bundle (B). In the second hollow fiber bundle (B), the concentrated fluid flows in an opposite direction to that in the first hollow fiber bundle (A), and the flow expands in the radial direction. During passage through the hollow fiber bundle (B), the concentrated fluid is further separated by reverse osmosis, and the permeated fluid flows into the lumens of the hollow fibers and the remaining fluid being not permeated flows into an annular space (13b) which is formed between a peripheral surface of the second hollow fiber bundle (B) and the inner surface of the cylindrical vessel. This flow pattern in the two hollow fiber bundles (A) and (B) is repeated in the subsequent hollow fiber bundles, and the degree of concentration of fluid is progressed in lower flow region. Thus, the flow pattern is centripetal in the axial direction (toward the center) in the odd-numbered hollow fiber bundles and is centrifugal in the axial direction (outward) in the even-numbered hollow fiber bundles. The permeated fluid which has permeated the hollow fiber membrane flows into the means (7) for collecting permeated fluid via the tube sheet (20), with which open ends of hollow fibers are sealingly connected, and then flows into a passageway (17) of the fitting means (8) via concentrically cyclic channels (18) and radial channels (19) which are provided in the surface of the means (7) for collecting a permeated fluid. Besides, the permeated fluid passes through a central bore (15) of the fitting means (8) and flows within the permeation fluid pipe (6) and then is taken out from outlets (11a) and (11b) for taking out the permeated fluid which are provided on the end walls (2) and (3) of the apparatus, respectively.

Elastic packing, (30) and (31) are provided in the outer periphery of the permeation fluid pipe (6) and cylindrical periphery of the fitting means (8), respectively. These packings act as seals for preventing mixing of the permeated fluid and the concentrated fluid. Other elastic packings (34) and (32) are provided on the outer ring of the plane surface of the means (7) for collecting a permeated fluid and on the circumference of the tube sheets (20), respectively, and they have also the same function. An elastic packing (33) provided on an endblock (23) acts as a seal for preventing mixing of the feeding fluid and the fluid not being permeated. However, when the permeated fluid is used, for example, for the processing of Brackish water desalination and the sea water desalination and so on, the sealability of the packing (33) is not so severe in comparison with other packings.

One end of the permeation fluid pipe (6) is connected with the fitting means (8), and the other end thereof is fitted to the outlets (11a) and (11b) of the end walls (2) and (3) or to a connecting pipe (9). The permeation fluid pipe (6) takes a load of the outer pressure added on the circumference due to the operation pressure and also a load in the axial direction due to pressure loss of the concentrated fluid which flows within the hollow fiber assemblies and in the passageway (16) of the fitting means (8). Accordingly, the apparatus is usually designed so as to decrease not so much the effective pressure in the reverse osmosis operation by controlling the pressure loss due to flow of the concentrated fluid within 2 kg/cm$^2$, preferably within 1 kg/cm$^2$, as the whole module containing a plurality of hollow fiber bundles. (Thus, the load in the axial direction due to the above-mentioned pressure loss is not a factor for rate-determination in calculating the strength of the permeation fluid pipe. The material and wall thickness of the permeation fluid pipe is mainly determined by the resistant strength against the load of the outer pressure added on the circumference of the pipe). Besides, the inner diameter of the permeation fluid pipe should also be controlled so as to inhibit the decrease of the effective pressure difference during the reverse osmosis operation as small as possible by controlling the pressure loss due to flow of the permeated fluid within 1 kg/cm$^2$, preferably 0.5 kg/cm$^2$.

The permeation fluid pipe (6) may be a plastic pipe made of a plastic material such as nylon, polyvinyl chloride, fiber-reinforced epoxy resin; stainless steel pipe; coated carbon-steel pipe; or the like.

Figure 3:
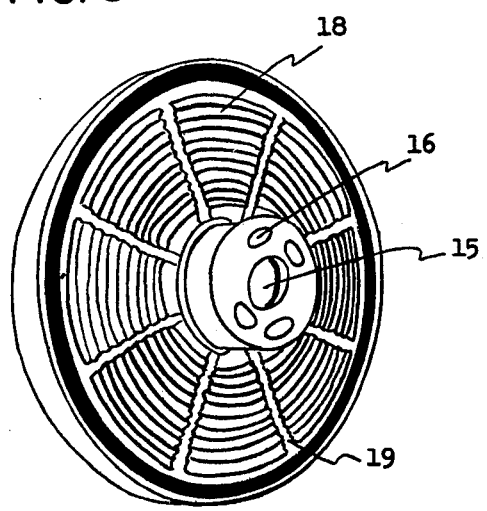
FIG. 3 shows a schematic perspective view of the means for collecting a permeated fluid and the fitting means when both are joined.

It is one of the characteristics of the present invention that the means (7) for collecting a permeated fluid should be provided with concentric triangular channels as is shown in FIG. 3 and should have such a structure that it contacts in line with the open ends of the hollow fibers at the tubular plate (20) so as not to close the open ends of hollow fibers. The means (7) for collecting a permeated fluid may have any structure only if the above-mentioned function can be achieved, for example, a sinter forming material, a net-like material, or a cell-like structure wherein the means is connected only with the outer peripheral ring (21) and the inner peripheral ring (22) of the tube sheet. However, the means (7) should have a space volume so that the pressure loss due to the flow of permeated fluid is made as small as possible and can be ignored.

Another characteristic of the present invention is that the fitting means (8) has separate passageways for transporting separately the permeated fluid and the concentrated fluid to the next hollow fiber assembly. This fitting means (8) may be fixed with the means (7) for collecting a permeated fluid by a screw or by adhering with an adhesive, or may be made integrally with the means (7). The fitting means (8) has at least one passageway (17) for passing the permeated fluid at the central region which penetrates the means perpendicularly to the axial direction and is led to the central bore (15) and also at least one passageway (16) for passing the concentrated fluid which is provided in the axial direction in parallel and adjacent to the central bore (15).

According to the fluid separation apparatus of the present invention, no piping for feeding or taking out of the fluid is required outside of the cylindrical vessel, but the connecting pipes can merely be provided at the end walls. Accordingly, when a plurality of the fluid separation apparatuses are arranged in a line or by piling up stepwise like "Christmas tree", the connection and piping can easily be done, and further, many apparatuses can be arranged within a small space, by which the whole of the apparatus assembly can be made compact.

In the fluid separation apparatus of the present invention, the enlargement of the capacity of the apparatus can be achieved by containing a plurality of hollow fiber assemblies in a pressure vessel, and hence, the apparatus does not show undesirable pressure loss of the fluid and concentration poralization phenomenon which appear in the conventional apparatus which is enlarged merely by lengthening of the longitudinal size or enlarging of the diameter of the hollow fiber assembly. That is, a plurality of hollow fiber assemblies, which length is determined appropriately after taking into consideration inhibition of pressure loss due to flow of permeation fluid, are arranged in series as shown in the figures, and hence, when the apparatus is operated so as to get the same recovery ratio as in the conventional fluid separation apparatus consisting of a single enlarged hollow fiber assembly, the recovery ratio at each hollow fiber assembly in the present apparatus may be smaller, which means that the present apparatus can treat the fluid at a higher flow speed and the boundary layer of the hollow fiber membrane can be made extremely thinner. Accordingly, the fluid separation apparatus of the present invention has a higher separation capacity in comparison with the conventional apparatus using a single enlarged hollow fiber assembly.

Figure 4:
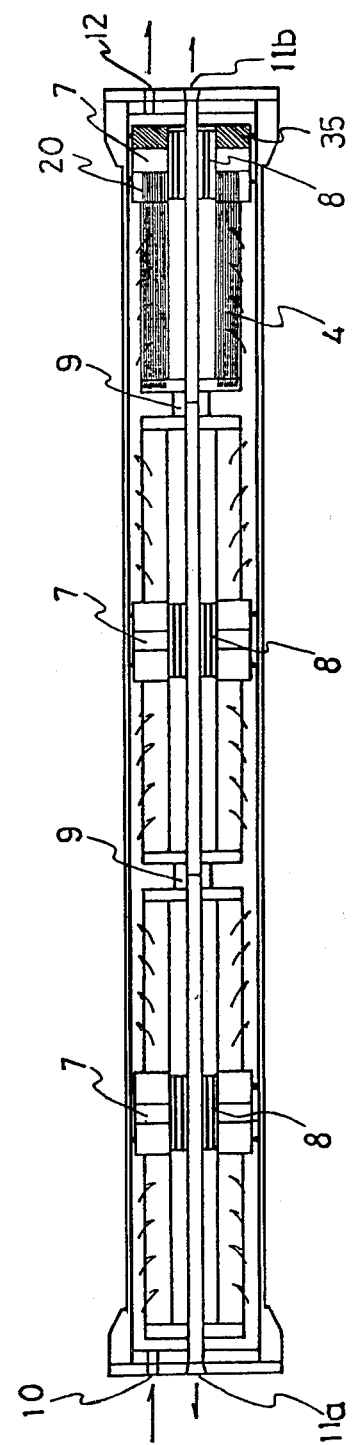
FIG. 4 shows a front sectional view of another embodiment of the present fluid separation apparatus, wherein five hollow fiber assemblies are contained.

The number of the hollow fiber assemblies to be contained in the present fluid separation apparatus may be varied after taking into consideration the overall pressure loss in flow of fluid within the apparatus and the break of hollow fibers at a high flow speed in the hollow fiber assemblies at the most upper flow area. It is usually in the range of 2 to 10, preferably 2 to 6. Because the hollow fiber assemblies are usually used in a pair, the number of hollow fiber assemblies contained in the present apparatus is usually an even-number, but an additional hollow fiber assembly may be contained in addition to one or more pairs of unit structure in accordance with the volume of the cylindrical pressure vessel. The accompanying FIG. 4 shows such an embodiment, wherein one hollow fiber assembly is used in addition to two pairs of unit structure. That is, a hollow fiber assembly (4) is provided with a means (7) for collecting a permeated fluid and a fitting means (8) on the face of a tube sheet (20), into which the lumens of hollow fibers open, and thereon a plate (35) having the same shape as the tube sheet (20) is provided. The plate (35) may be a plastic plate or a steel plate, which do not permeate a liquid. This plate (35) functions to keep liquid-sealed the means (7) for collecting a permeated fluid so that the permeated liquid collected therein does not pass toward the end wall.

The hollow fibers used in the present invention include all fibers having an outer diameter of 10 to 1,000 μm and a hollow ratio of 3 to 80%, a membrane wall of which has a selective permeability of fluids. The membrane wall of the hollow fibers may be homogeneous or anisotropic. The materials for the hollow fiber membrane include various polymers such as celluloses, cellulose esters, cellulose ethers, polyamides, silicones, vinyl polymers, or the like.

The resins for forming a resin layer such as the tube sheet (20), the end-block (23) are preferably resins which are a fluidable liquid before curing and can give a hard solid by curing thereof. Suitable examples of the resins are epoxy resins, silicone resins, polyurethane resins, unsaturated polyester resins, or the like.

The means for collecting a permeated fluid and the fitting means may be made of metals, resins, or the like, and the dimensions thereof such as thickness and length are not specified if the desired functions are satisfied. The cylindrical pressure vessel used in the present invention is preferably a cylindrical vessel having an inner diameter of 20 to 700 mm and a length of 200 to 7,000 mm, but the shape thereof is not necessarily restricted.

The hollow fiber membrane-type fluid separation apparatus of the present invention is applied to, for example, desalination of sea water, desalination of brackish water, purification of various kinds of waste water, reverse osmosis such as preparation of sterilized water, ultrafiltration such as recovery of paint from waste water in electrodeposition painting and concentration or recovery of useful materials from foods, liquid permeation such as separation of para-xylene from xylene mixtures, gas permeation such as recovery of helium and purification hydrogen, or the like. In any cases, it is possible to carry out efficiently a large-scale treatment by using the apparatus of the present invention.

What is claimed is:

1. A fluid separation apparatus which comprises at least one pair of unit structures which are arranged uniaxially in series within a cylindrical pressure vessel, each pair of unit structures comprising:
   a pair of cylindrical hollow fiber assemblies having a selective permeability;
   a pair of cores, each arranged internal to and concentric with a respective one of the cylindrical hollow fiber assemblies;
   a pair of permeating fluid pipes, each arranged internal to and concentric with a respective one of the cores;
   collecting means connected to one end of each pair of cylindrical hollow fiber assemblies for collecting permeated fluid from the cylindrical hollow fiber assemblies, said collecting means being connected to adjacent ends of their respective cylindrical hollow fiber assemblies; and
   fitting means connected to said collecting means and to corresponding ends of each core and permeating fluid pipe, said fitting means being adapted so that the collected permeated fluid passes to the permeating fluid pipes for passage there-through and the remaining fluid passes between the cores.

2. An apparatus according to claim 1, wherein the means for collecting a permeated fluid and the fitting means are made integrally.

3. An apparatus according to claim 1, wherein the means for collecting a permeated fluid has concentrically cyclic channels and radial channels on the surface thereof, through which the permeated fluid passes and flows into a passageway of the fitting means.

4. An apparatus according to claim 1, wherein the fitting means has a central bore which is provided at the central region of the fitting means and is connected to the permeation fluid pipes, a passageway for passing the concentrated fluid which is provided in the axial direction in parallel and adjacent to the central bore, and a passageway for passing the permeated fluid at the central region which penetrates the fitting means perpendicularly to the axial direction and is led to the central bore.

5. An apparatus according to claim 1, wherein two or more pairs of unit structures are contained in series in a cylindrical pressure vessel and these unit structures are connected with a connecting pipe.

6. An apparatus according to claim 1, wherein an additional hollow fiber assembly is arranged in addition to one or more pairs of unit structures in series.

7. An apparatus according to claim 1, wherein the cylindrical pressure vessel has an inner diameter of 20 to 700 mm and a length of 200 to 7,000 mm.

8. An apparatus according to claim 1, wherein the hollow fibers have an outer diameter of 10 to 1,000 μm and a hollow ratio of 3 to 80%.

9. An apparatus according to claim 1, wherein the hollow fiber assemblies have an outer peripheral ring and an inner peripheral ring at a tube sheet and an end-block ring in an end-block.

* * * * *